Aug. 19, 1958 R. E. NIENBURG 2,848,608

ELECTRONIC RING CIRCUIT

Filed Dec. 8, 1954 2 Sheets-Sheet 1

*INVENTOR.*
RAYMOND E. NIENBURG
*BY* Ralph L. Thomas
ATTORNEY

Aug. 19, 1958 R. E. NIENBURG 2,848,608

ELECTRONIC RING CIRCUIT

Filed Dec. 8, 1954 2 Sheets-Sheet 2

INVENTOR.
RAYMOND E. NIENBURG

BY *Ralph L. Thomas*

ATTORNEY

United States Patent Office 2,848,608

Patented Aug. 19, 1958

2,848,608

ELECTRONIC RING CIRCUIT

Raymond E. Nienburg, Wappingers Falls, N. Y., assignor to International Business Machines Corporation, New York, N. Y., a corporation of New York Application December 8, 1954, Serial No. 473,874

8 Claims. (Cl. 250—27)

The present invention relates generally to electronic circuits and particularly to electronic circuits which employ logical components.

An object of the present invention is to provide an improved ring circuit which is simplified in construction yet is very reliable.

Another object of the present invention is to provide an improved ring circuit which employs passive networks that respond to pulses of very short duration to control the advance of information around the ring circuit.

A further object is to provide an improved ring circuit in which a passive network, responsive to pulses of extremely short duration, is employed between the input circuits of adjacent flip-flops which are arranged to form a ring circuit.

A still further object of the present invention is to provide an improved passive network which, when conditioned by D. C. potential, passes pulses of extremely short duration to several transformer coupled load circuits.

Other objects of the invention are pointed out in the following description and claims and illustrated in the accompanying drawings which disclose, by way of example, the principle of the invention and the best mode which has been contemplated of applying that principle.

Figure 1:
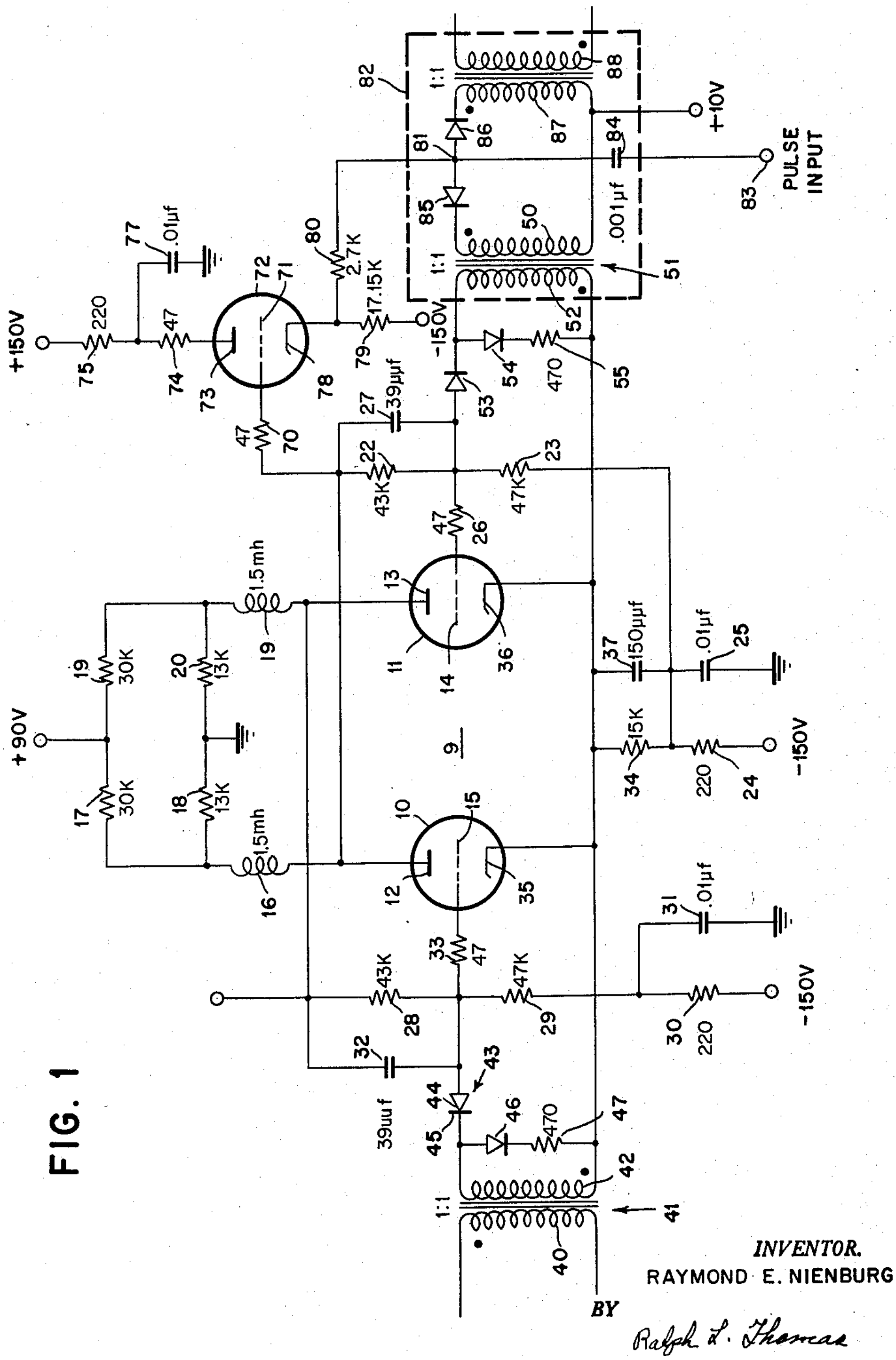
Figure 1 illustrates a wiring schematic of one stage of the ring circuit of the present invention.

Reference is made to Figure 1 for a description of the electronic ring circuit of the present invention. A flip-flop 9, a bi-stable electronic circuit, includes two amplifying vacuum tubes 10 and 11 which may be the respective halves of a 5965 twin triode. Anodes 12 and 13 of the vacuum tubes 10 and 11 are cross-coupled to control grids 14 and 15 as shown. If one of the amplifying tubes 10 or 11 is conducting, the other is non-conducting except during a transition in state when both tubes may be non-conducting momentarily.

Operating D. C. potential is supplied to the anode 12 through a peaking coil 16 which is tapped from a voltage divider comprising resistors 17 and 18 serially connected between a source of +90 volts and ground. Resistors 19 and 20, connected serially between a source of +90 volts and ground, constitute another voltage divider which supplies D. C. potential through a peaking coil 19 to anode 13.

A further voltage divider network which constitutes part of the load circuit for anode 12 includes resistors 22, 23 and 24 connected serially between the anode 12 and a source of −150 volts. The resistor 24 and a condenser 25 serve as a decoupling network which substantially prevents voltage fluctuations in the −150 volts source from substantially affecting the potential across the voltage divider network; also, voltage fluctuations across the voltage divider network are substantially prevented from affecting the −150 volts source. Control voltage for the grid 14 of the vacuum tube 11 is obtained from the junction point of the resistors 22 and 23 of the voltage divider network through a parasitic resistor 26. A condenser 27, connected in parallel with the resistor 22, serves as a compensating capacitor which helps to insure that the voltage wave at the anode 12 during a change of state is applied with sufficient amplitude and proper shape to the grid 14. This condenser serves also as a memory capacitor to insure that the vacuum tube 11 is rendered conductive whenever both tubes are momentarily rendered non-conductive during a change of state in which vacuum tube 11 was previously non-conductive.

A voltage divider network which constitutes part of the load circuit for the anode 13, includes resistors 28, 29 and 30 serially connected between the anode 13 and the source of −150 volts. The separate voltage source here is varied to change the potential across the voltage divider network when it is desired to test the stability of the flip-flop 9. The resistor 30 and a condenser 31 perform as a decoupling network to minimize voltage fluctuations. Control voltage for the grid 15 of the vacuum tube 10 is obtained from the junction point of the resistors 28 and 29 through a parasitic resistor 33. A condenser 32, connected in parallel with the resistor 28, serves as a compensating capacitor which helps to insure that the voltage wave at the anode 13 during a change of state is applied with sufficient amplitude and proper shape to the grid 15. This condenser serves also as a memory capacitor to insure that the vacuum tube 10 is rendered conductive whenever both tubes are momentarily rendered non-conductive during a change of state where vacuum tube 10 was previously non-conductive.

A resistor 34, connected between the resistor 24 and the common connection point of the cathodes 35 and 36, provides cathode degeneration for the two amplifying tubes 10 and 11. The charge on a by-pass condenser 37, connected across the resistor 34, is little affected by a short duration input pulse, and the effect of this condenser is to hold the cathodes 35 and 36 at substantially the same potential at all times. Thus a negative pulse applied across the grid-cathode circuit of the conducting tube creates no appreciable change in potential at the cathodes 35 and 36.

A positive input pulse to a primary winding 40 of a transformer 41 establishes a negative pulse on a secondary winding 42. The secondary winding 42 is serially connected with a diode 43 and the resistor 33 between the grid 15 and the cathode 35. All of this negative pulse is passed by the diode 43 provided the potential on its anode 44 is positive relative to the potential at its cathode 45. When the vacuum tube 10 is non-conducting, its grid potential is at or below cut off, and a negative pulse, whether passed by diode 43 or not, does not affect the non-conducting state of this vacuum tube. If the vacuum tube 10 is conducting, however, its grid bias potential is approximately zero volts or slightly positive which conditions diode 43 to the threshold of conduction. A negative pulse across the secondary winding 42 now causes the potential at the cathode 45 of the diode 43 to go further negative; whereupon the diode 43 passes the negative pulse to the grid 15 and stops conduction in the vacuum tube 10. A diode 46 and a resistor 47, connected in series across the secondary winding 42, serve to dissipate and limit positive overshoot voltages which occur on the upper side of the secondary winding 42 as a result of the decay of a positive pulse on the primary winding 40.

In a like fashion a positive pulse applied to a primary winding 50 of a transformer 51 establishes a negative pulse on a secondary winding 52 which is passed by a diode 53 through the resistor 26 to the grid 14 whenever the vacuum tube 11 is conducting. The diode 54 and a resistor 55, connected in series across the secondary winding 52, serve to dissipate and limit positive overshoot voltages which occur on the upper side of the secondary winding 52 as a result of the decay of a positive pulse on the primary winding 50.

In order to illustrate the operation of the flip-flop 9, assume a positive pulse is applied to the primary winding 40 of the transformer 41 when the vacuum tube 10 is conducting. The diode 43, which is at the threshold of conduction because the grid bias of the vacuum tube 10 is zero or slightly positive, passes the resulting negative pulse produced across the secondary winding 42 to the grid 15. As the grid 15 goes negative beyond cutoff, the potential at the anode 12 of the vacuum tube 10 rises toward +10 volts. This positive going potential is coupled through the resistor 22 and the condenser 27 to the grid 14 and initiates conduction in the vacuum tube 11 as soon as its grid potential rises above the cutoff potential. As current conduction commences in the vacuum tube 11, its anode potential starts decreasing from +10 volts until at full conduction it reaches −30 volts. This decreasing potential at the anode 13 is coupled through the resistor 28 and the condenser 32 to the grid 15 and maintains the grid 15 below the cutoff potential. In this condition with the vacuum tube 11 conducting and the vacuum tube 10 non-conducting, the flip-flop circuit is said to be On.

If a positive pulse is now applied to the primary winding 50 of the transformer 51, the resulting negative pulse produced across the secondary winding 52 is passed by the diode 53 and applied through the resistor 26 to the grid 14. As the grid 14 goes negative beyond cutoff, the potential at the anode 13 of the vacuum tube 11 rises toward +10 volts. This positive going potential is coupled through the resistor 28 and the condenser 32 to the grid 15 and initiates conduction in the vacuum tube 11 as soon as its grid potential rises above the cutoff potential. As current conduction commences in the vacuum tube 10, its anode potential starts decreasing from +10 volts until at full conduction it reaches −30 volts. This decreasing potential at anode 12 is coupled through the resistor 22 and the condenser 27 to the grid 14 and maintains the grid 14 below the cutoff potential. In this condition with the vacuum tube 11 non-conducting and the vacuum tube 10 conducting, the flip-flop circuit is said to be Off. It is noted that in each case above, pulses are applied to the input transformer of the conducting tube to drive the conducting tube to the non-conducting condition.

An output potential is taken from the anode 12 of the vacuum tube 10 and applied through a parasitic suppression resistor 70 to a control grid 71 of a vacuum tube 72. This vacuum tube and its associated circuit elements constitute a cathode follower circuit which is an amplifier that provides proper impedance matching between input and output circuits while maintaining the output potential at a gain of slightly less than unity. The vacuum tube 72 of the cathode follower circuit has its anode 73 connected through resistors 74 and 75 to a source of +150 volts and its cathode 78 connected through a cathode resistor 79 to a source of −150 volts. The resistor 75 and a condenser 77 serve as a decoupling network which substantially prevents potential variations in the +150 volts source and potential variations at the anode 73 from affecting each other; whereas the resistor 74 serves to suppress parasitic voltages.

When the flip-flop 9 is On, the positive potential at the anode 12 is applied through the resistor 70 to the grid 71 of the vacuum tube 72, and the positive potential level at the cathode 78 is coupled by a current limiting resistor 80 to a junction point 81 of a passive network 82. It is also seen that if the flip-flop 9 is Off, the negative potential at the anode 12 establishes a negative potential at the junction point 81 of the passive network 82.

The passive network enclosed in broken line block 82 serves the function of a high speed logical And circuit which passes or rejects 0.1 microsecond pulses received at the junction point 81. Positive pulses on the order of 30 volts applied to a terminal 83 are coupled by a condenser 84 to the junction point 81. Diodes 85 and 86 are connected in series with respective primary windings 50 and 87 to form two parallel circuits connected between junction point 81 and a source of +10 volts.

Whenever the potential at the junction point 81 is −30 volts as a result of the flip-flop 9 being Off, the diodes 85 and 86 have a reverse potential of approximately 40 volts thereacross which biases them in the non-conducting condition. If a 0.1 microsecond positive pulse of 30 volts is applied now to the junction point 81, the resulting potential at this junction point is raised to approximately zero volts for the duration of the pulse, but the pulse is rejected by the passive network 82 since the diodes are still maintained in the non-conducting condition by a reverse potential of 10 volts during the pulse interval; the +10 volts source which is connected to the primary windings 50 and 87 provides the 10 volts reverse bias.

Whenever the potential at the junction point 81 is +10 volts as a result of the flip-flop 9 being On, the diodes 85 and 86 have a potential of approximately zero volts thereacross which conditions these diodes at the threshold of conduction. If now a 0.1 microsecond positive pulse of 30 volts is applied to the junction point 81, the resulting potential at this junction point is raised to approximately +40 volts for the duration of the pulse, and the pulse is passed since the diodes have a forward bias potential of approximately 30 volts. Consequently the positive pulse causes current flow through the primary windings 50 and 87 which in turn establish a negative pulse on the secondary winding 52 and a secondary winding 88 respectively. Since negative pulses are supplied by the secondary windings to their respective flip-flops, it is seen that the preceding flip-flop is turned Off as the succeeding flip-flop is turned On.

Figure 2:
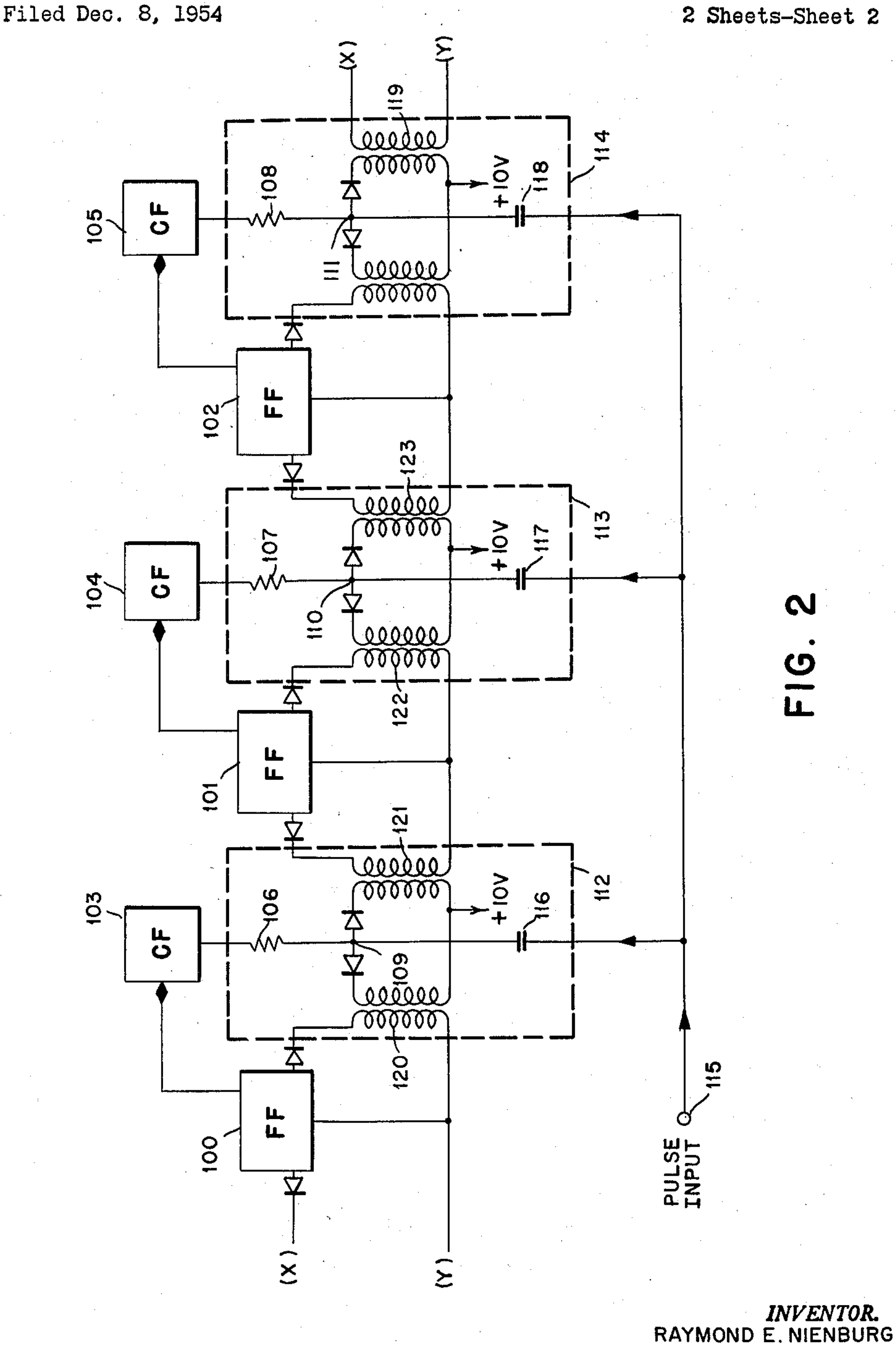
Figure 2 is an illustration of a three stage ring circuit with some of the components being shown in block form.

Reference is made to Figure 2 for a description of a three stage ring circuit constructed in accordance with the principles of the present invention. The flip-flop and associated cathode follower, shown in block form, are identical to the flip-flop and associated cathode follower described in Figure 1. When any one of the flip-flops 100 through 102 is in the On condition, a positive D. C. level is supplied to its respective cathode follower 103 through 105. The output of each of the cathode followers 103 through 105 is connected through its respective resistor 106, 107 or 108 to a respective junction point 109, 110 or 111 of a respective passive network 112, 113 or 114. Positive 0.1 microsecond pulses are supplied from an input terminal 115 to the passive networks 112 through 114 by respective condensers 116 through 118. In a preferred embodiment, the output from a secondary winding 119 in the right-most stage in Figure 2 is applied as an input to flip-flop 100 in the left-most stage, thereby forming a closed ring.

In order to illustrate the operation of the ring circuit of Fig. 2, assume that flip-flop 100 is On and flip-flops 101 102 are Off. A positive D. C. potential is thus established on junction point 109, and a negative D. C. potential is established on junction points 110 and 111. Upon receipt of a positive pulse at terminal 115, passive network 112 passes the pulse and passive networks 113 and 114 reject the pulse. The pulse passed by passive network 112 establishes a negative pulse on secondary windings 120 and 121 in the manner previously described. The negative pulse on winding 120 turns flip-flop 100 Off; whereas the negative pulse on winding 121 turns flip-flop 101 On. Consequently the D. C. potential at junction point 109 is changed from positive to negative; while the D. C. potential at junction point 110 is changed from negative to positive; and the negative D. C. potential at junction point 111 remains unchanged. Upon receipt of the next pulse at terminal 115, negative pulses are passed by passive network 113 and rejected by passive networks 112 and 114. Consequently flip-flop 101 receives a negative pulse through secondary winding 122, and flip-flop 102 receives a negative pulse through secondary winding 123 which causes these flip-flops to assume the Off and On states respectively. As successive pulses are applied to terminal 115, the On condition is caused to advance to the succeeding flip-flops around the ring circuit.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A ring circuit comprising a plurality of adjacent stages, each stage including at least a flip-flop and an associated passive network, said flip-flops having two input circuits and an output circuit, each of said passive networks having two parallel branches, one of said parallel branches of each of said passive networks being coupled to one of said input circuits of its associated flip-flop, the other of said parallel branches being coupled to one of said input circuits of a flip-flop in an adjacent succeeding stage, a source of pulses, coupling means for coupling the potential from said output circuit to said passive network, coupling means for coupling said source of pulses to all of said passive networks.

2. A ring circuit comprising a plurality of adjacent stages, each stage including at least a bi-stable device and an associated passive network, said bi-stable device of each stage having two input circuits and an output circuit, said associated passive network of each stage having two parallel branches, one of said parallel branches of each passive network being coupled to one of said input circuits of said bi-stable device in the same stage, the other of said parallel branches being coupled to one of said input circuits of a bi-stable device in an adjacent succeeding stage, a source of pulses, coupling means for coupling the potential from said output circuit to said passive network, coupling means for coupling said source of pulses to all of said passive networks.

3. A ring circuit comprising a plurality of stages, each stage including a passive network and a flip-flop, said flip-flop of each stage having first and second input circuits and an output circuit, said passive network of each stage being coupled between said first and second input circuits of flip-flops in adjacent stages, coupling means for coupling said output circuit of said flip-flop in each stage to said passive network in the same stage, a pulse source coupled to all of said passive networks whereby passive networks pass pulses from said pulse source to said first and second input circuits of flip-flops in adjacent stages when said output circuits have predetermined potentials.

4. An electronic circuit comprising a plurality of stages; each stage including a passive network and a flip-flop; said flip-flop of each stage having first and second input circuits and an output circuit; said passive network of each stage including a pair of diodes, a first transformer and a second transformer; each of said diodes having an anode and a cathode; said anodes of said diodes in each passive network being coupled to said output circuit in the same stage; a source of fixed potential for each of said passive networks; said first and second transformers having primary and secondary windings; said primary winding of said first transformer of each stage being connected between said source of fixed potential and the cathode of one diode of said pair of diodes in each stage, said primary winding of said second transformer of each stage being connected between said source of fixed potential and the cathode of the other diode of said pair of diodes in the same stage, said secondary windings of each stage being connected to first and second input circuits of adjacent stages; a source of pulses; and means coupling said source of pulses to both anodes of said pair of diodes in each stage whereby said passive network passes a pulse to said first and second input circuits whenever said source of fixed potential is substantially equal to the output potential from said output circuit.

5. An electronic circuit comprising a plurality of adjacent stages; each stage including a passive network and a flip-flop, each of said flip-flops having first and second input circuits and an output circuit; each of said passive networks including a pair of diodes, each of said diodes having an anode and a cathode, means coupling the anodes of said pair of diodes in each stage to said output circuit in the same stage, a point of reference potential, first and second transformers for each passive network having primary and secondary windings, said primary winding of said first transformer in each stage being connected between the cathode of one diode of said pair of diodes in the same stage and said point of reference potential, said primary winding of said second transformer being connected between the cathode of the other diode of said pair of diodes in the same stage and said point of reference potential, said secondary windings being connected to said first and second input circuits of flip-flops in adjacent stages, a source of pulses, and means coupling said source of pulses to both anodes of said pair of diodes in each stage whereby said passive network in a given stage passes pulses to said first and second input circuits of flip-flops in adjacent stages whenever the output potential from said output circuit in the given stage is substantially equal to the potential at said point of reference potential.

6. An electronic circuit comprising a plurality of adjacent stages; each stage including a passive network and a flip-flop; each of said flip-flops having first and second input circuits and an output circuit; each of said passive networks including a pair of diodes, each of said diodes having an anode and a cathode, means coupling the anodes of said diodes to said output circuit; a point of reference potential; each of said passive networks including first and second transformers having primary and secondary windings, said primary winding of said first transformer of each passive network being connected between the cathode of one diode of said pair of diodes in that stage and said point of reference potential, said primary winding of said second transformer being connected between the cathode of the other diode of said pair of diodes in that stage and said point of reference potential, the secondary winding of said first transformer being connected to said first input circuit of said flip-flop in that stage, the secondary winding of said second transformer being connected to said second input circuit of a flip-flop in an adjacent stage; a source of pulses; means coupling said source of pulses to both anodes of said pair of diodes in each stage whereby said passive network of a given stage passes pulses to said first and second input circuits of flip-flops in adjacent stages whenever the output potential from said output circuit of the given stage is substantially equal to the potential at said point of reference potential.

7. An electronic circuit comprising a plurality of adjacent stages, each stage including at least a passive network and a flip-flop, each of said flip-flops having first and second input circuits and an output circuit; each of said passive networks including a pair of diodes, each of said diodes having an anode and a cathode, means coupling the anodes of said diodes in each passive network to said output circuit in the same stage, a source of fixed potential, first and second transformers for each passive network, said first and second transformers having primary and secondary windings, said primary winding of said first transformer in each passive network being connected between said source of fixed potential and the cathode of one diode of said pair of diodes in the same passive network, said primary winding of said second transformer in each passive network being connected between said source of fixed potential and the cathode of the other diode of said pair of diodes in the same passive network, the secondary winding of said first transformer being connected to said first input circuit of said flip-flop in the same stage, the secondary winding of said second transformer being connected to said second input circuit of a flip-flop in an adjacent stage, a source of pulses, means coupling said source of pulses to both anodes of all pairs of said diodes whereby said passive network passes a pulse to said first and second input circuits whenever said source of fixed potential is substantially equal to the potential from said output circuit.

8. An electric circuit comprising a plurality of adjacent stages, each stage including a passive network and a bi-stable device, each of said bi-stable devices having first and second input circuits and an output circuit; each of said passive networks including a pair of diodes, each of said diodes having an anode and a cathode, means coupling the anodes of said diodes in each passive network to said output circuit in the same stage, a point of reference potential, first and second transformers for each passive network, said first and second transformers having primary and secondary windings, said primary winding of said first transformer in each passive network being connected between said point of reference potential and the cathode of one diode of said pair of diodes in the same passive network, said primary winding of said second transformer in each passive network being connected between said point of reference potential and the cathode of the other diode of said pair of diodes in the same passive network, said secondary windings being connected to said first and second input circuits of bi-stable devices in adjacent stages, a source of pulses, means coupling said source of pulses to both anodes of said pair of diodes in each passive network whereby said passive networks pass a pulse to said first and second input circuits whenever said source of fixed potential is substantially equal to the potential from said output circuit of the same stage.

References Cited in the file of this patent

UNITED STATES PATENTS

| | | |
|---|---|---|
| 2,551,119 | Haddad et al. | May 1, 1951 |
| 2,552,781 | Hadfield | May 15, 1951 |
| 2,662,983 | Gordon | Dec. 15, 1953 |
| 2,682,615 | Sziklai et al. | June 29, 1954 |
| 2,685,039 | Scarbrough et al. | July 27, 1954 |
| 2,691,073 | Lowman | Oct. 5, 1954 |
| 2,782,307 | Von Sivers et al. | Feb. 19, 1957 |

FOREIGN PATENTS

| | | |
|---|---|---|
| 158,699 | Australia | Aug. 13, 1953 |